United States Patent [19]
Brauer et al.

[11] Patent Number: 5,574,257
[45] Date of Patent: Nov. 12, 1996

[54] TELECOMMUNICATIONS ARTICLES CONTAINING GELLED OIL COMPOSITIONS

[75] Inventors: Melvin Brauer, East Brunswick; Thomas W. Sheedy, Chatham, both of N.J.

[73] Assignee: CasChem, Inc., Bayonne, N.J.

[21] Appl. No.: 327,726

[22] Filed: Oct. 24, 1994

Related U.S. Application Data

[63] Continuation-in-part of Ser. No. 961,233, Oct. 15, 1992, Pat. No. 5,358,664.

[51] Int. Cl.$^6$ .............. B01J 13/00; H01B 17/34; H02G 15/22
[52] U.S. Cl. .............. 174/76; 174/77 R; 252/315.4; 439/275; 439/936
[58] Field of Search ................ 252/315.4, 37.5, 252/37.7; 385/66, 84, 100; 174/19, 257, 258, 76, 77 R; 439/933, 275

[56] References Cited

U.S. PATENT DOCUMENTS

| | | | |
|---|---|---|---|
| 1,422,910 | 7/1922 | Young et al. | 174/19 X |
| 2,252,087 | 8/1941 | McNab et al. | 252/37.5 X |
| 2,491,641 | 12/1949 | Bondi | 252/315.4 |
| 2,930,835 | 3/1960 | Bollmeier | 174/19 X |
| 3,345,291 | 10/1967 | Koundakjian et al. | 252/37.7 |
| 3,776,846 | 12/1973 | Bailey et al. | 252/37.7 |
| 3,791,972 | 2/1974 | Myers | 252/37.7 |
| 3,939,082 | 2/1976 | Williams et al. | 252/32.7 |
| 4,324,453 | 4/1982 | Patel | 350/96.23 |
| 4,370,023 | 1/1983 | Lange et al. | 350/96.23 |
| 4,701,016 | 10/1987 | Gartside, III et al. | 350/96.23 |
| 4,709,982 | 12/1987 | Corne et al. | 350/96.23 |
| 4,711,523 | 12/1987 | Iri et al. | 350/96.23 |
| 4,787,703 | 11/1988 | Tomko et al. | 350/96.23 |
| 4,810,395 | 3/1989 | Levy et al. | 252/315.4 |
| 4,943,685 | 7/1990 | Reynaert | 174/19 |
| 4,989,451 | 2/1990 | Story | 350/96.23 |
| 4,997,720 | 3/1991 | Bourbonais et al. | 428/900 |
| 5,050,959 | 9/1991 | Randisi | 385/100 |
| 5,358,664 | 10/1994 | Brauer | 252/315.4 |

FOREIGN PATENT DOCUMENTS

| | | |
|---|---|---|
| 145609 | 6/1991 | Japan. |
| 196104 | 8/1991 | Japan. |

OTHER PUBLICATIONS

Vincent, John E., "Chemistry of Aluminum–Organics in the Preparation of Ink Vehicles and Gel Varnishes", American Ink Marker, Oct. 1984, pp. 25–35.
Samman Nicolas, "Chemistry of Aluminum Complex Grease Revisited", NLGI, Oct. 27–30, 1991.
Kruschwitz et al., "The Development of Formulation for Aluminum Complex Thickener Systems", NLGI, May 1976, vol. 40, pp. 51–59.
Hamnelid et al., "Amazing Grease or Finding the Right Way to Consistency", NLGI, Nov. 1991, vol. 55.8, pp. 11–299–20–308.
Kruschwitz, H. W., "Thickener Systems for Aluminum Complex Greases", Rhone–Poulenc (1993).
Bellcore Communications Research–Technical Reference TR–NWT–000049, Issue 3, Sep. 1992, "Generic Requirements for Outdoor Telephone Network Interface Devices (NIDs)."
Applied Management Systems–"AMS–202 Wire Safe" brochure by Cashchem Inc., Sep. 1992.
Bellcore communications Research–Technical Reference TR–NWT–000251, Issue 2, May 1991, "Generic Requirement for Service Wire Splice For Buried Service Wire".
3M Electrical Products Division Brochure, 1993.
Ams Inc. Appplied Management Systems, "Overview of Technical Analysis–AMS–202 Wire Safe", Bellcore Draft for Comment, dated Jan. 1994, by Howard W. Rudolph.

*Primary Examiner*—Richard D. Lovering
*Attorney, Agent, or Firm*—Pennie & Edmonds

[57] ABSTRACT

The invention generally relates to the protection of telecommunications and electrical devices, such as terminal blocks, with gelled oil compositions that employ aluminum complex soaps as gelling agents. The telecommunications devices are typically installed in an enclosure, filled with the gelled oil composition, to protect the device from moisture and corrosion. The gelled oils also include an oil component, a bleed inhibitor of polybutene, and optional amounts of antioxidant and pour point depressant.

21 Claims, 1 Drawing Sheet

TELECOMMUNICATIONS ARTICLES CONTAINING GELLED OIL COMPOSITIONS

CROSS REFERENCE TO RELATED APPLICATION

This application is a continuation-in-part of application Ser. No. 07/961,233, filed Oct. 15, 1992, now U.S. Pat. No. 5,358,664.

FIELD OF THE INVENTION

This invention generally relates to telecommunications articles that incorporate gelled-oil filling compositions. More particularly, the invention relates to telecommunications articles, and in particular terminal blocks that contain electrical connections, junctions, or splices, protected from moisture and corrosion with gelled-oil compositions, preferably those which include aluminum complex based soaps.

BACKGROUND OF THE INVENTION

Telecommunications articles and devices, such as cables and service wires, terminal blocks that enclose splices, junctions, other connections, and other electrical devices, are often exposed to damaging environmental conditions. Yet, they are required to maintain their mechanical, electrical, and environmental characteristics for a service life of at least 40 years. In the past, telecommunications service wires were strung above ground between poles, and, occasionally, placed under water. Increasingly, these wires are being buried beneath the ground for aesthetic reasons and to protect them from extremes of temperature, rain, snow, ice, high winds, and downed tree limbs and the like. However, even when placed underground, these articles are subject to mechanical shock during back filling, moisture, the possibility of immersion, and exposure to salt and other corrosive materials.

While typically housed in an enclosure, terminal blocks, containing splices, junctions, and other connections between wires or between wires and telecommunications devices, are often vulnerable if not properly sealed against environmental hazards, such as moisture and corrosive elements. Typically, silicone grease lubricant, an elastomer seal, or mastic sealing strips have been used in an attempt to seal out moisture. While these sealants offer some protection, moisture can often seep into the enclosure and cause a short circuit, which will interrupt telecommunications service, particularly when the terminal block is buried under ground.

Telecommunications service wires are normally well protected. Service wires normally comprise a bundle of individually insulated copper wires, protected by a metal shield, which covers the bundle of wires, and an outer sheath made from plastic or other insulating material. This construction is normally sufficient to protect the wires. However, if the protective outer sheath of a service wire is cut or otherwise broken, water can seep into the wire and run along its length. This is particularly true when an immersed wire is cut. To protect against this situation, the wire is filled with a water resistant filling composition.

At a splice, junction, or other connection, the metal shield and outer protective sheath of the service wire must be removed to connect wires from two or more service wires or devices. These connections are required to splice long service wires together, to connect service areas, and to make service connections for individual customers. In an unprotected device, corrosion of the contacts or short circuits caused by moisture or other outside elements will eventually interrupt service. Replacement or repair of buried telecommunications articles, as well as any interruption of service, can be particularly difficult and expensive. Therefore, an enclosure filled with a protective, moisture resistant filling composition, must be provided to protect telecommunications articles from moisture and corrosion.

A variety of telecommunications articles, which require protection against moisture, are illustrated in a brochure entitled "Electrical Products," published by 3M. In providing protection for telecommunications articles, care must be taken to ensure that the electrical, mechanical, and environmental qualities of the article are not impaired. Thus, in formulating a protective filling composition for use in telecommunications articles, the protective filling composition must not only provide protection from moisture and corrosion, but also must not impair the electrical, mechanical, and environmental qualities of the telecommunications article. Moreover, the protective filling composition must not chemically attack the components of the service wire or the enclosure of the terminal block.

The requirements of protective filling compositions for telecommunications articles are not easily satisfied. A protective filling composition must remain stable throughout the temperature range of use of the service wire and terminal block, which should extend at least from −40° to +70° C. If the maximum working temperature of the protective filling composition is not at least as high as that of the electrical components, the filling composition may be subjected to a temperature sufficient to reduce its viscosity to the point that it runs out of the enclosure, exposing the article to moisture and corrosion. In addition, protective filling compositions must be fluid enough over the temperature range experienced during installation for the enclosure to completely fill the enclosure with the composition without the risk of breaking or over-stressing the electrical components.

The protective filling compositions should also be cohesive enough to ensure that compression of the enclosure will not result in the formation of voids in either the interior or surface of the composition. Also, the protective filling composition should be soft enough to allow such compression without subjecting the electrical components, to any significant strain, but, yet, resist flow under gravity as well as the hydrostatic pressures likely to be applied to the article if the end of a service wire is exposed in a flooded manhole.

It is known in the art that gelling agents such as clays and hydrophobic fumed silica may be employed to provide gelled oil formulations for use as effective protective filling compositions. Hydrophobic fumed silica, however, is expensive since relatively large amounts of fumed silica must be used to provide useful gels. Use of hydrophobic fumed silicas, moreover, can cause the resulting gels to be abrasive.

A need therefore exists for cable grease protective filling compositions that have improved properties against moisture and corrosive materials, and which avoid the abrasiveness of silica based gel formulations.

SUMMARY OF THE INVENTION

The invention generally relates to the use of gelled oil compositions to protect telecommunications articles and service cables from moisture and corrosive elements. In particular, the invention relates to the protection of telecommunications terminal blocks and the like with enclosures filled with gelled oil. The gelled oils comprise a hydrocarbon oil, a bleed inhibitor, an aluminum-complex soap, as well as optional antioxidants and pour point depressants. The gelled oils are particularly well suited for use filling service cables and enclosures for terminal blocks, around splices, junctions and other connectors and devices.

In accordance with the invention, gelled oil compositions having particular utility as filling compositions in telecommunications articles is provided. The gelled oil compositions include an oil component such as a hydrocarbon oil, one or more bleed inhibitors, and an aluminum soap complex. The gelled oils may optionally include antioxidants and pour point depressants. The oil component can be at least one of either a mineral oil, preferably a food grade mineral oil, a napthenic oil, a paraffinic oil, or a polyalphaolefin oil.

The gelled oil compositions comprise 40–90%, preferably 50–75% of the oil component, 5–50%, preferably 25–45% of bleed inhibitor, and 4–15%, preferably 6 to 12% of an aluminum soap complex of a fatty acid and an aromatic acid. Fatty acids for manufacture of the aluminum soap complexes can include at least one of stearic acid, oleic acid, myristic acid, capric acid, and palmitic acid. Bleed inhibitors can include block copolymers such as rubber compounds and hydrocarbons of less than 10 carbon atoms which have been polymerized into an oil, and which have an aromatic content of less than 6%. Useful rubber compounds include butyl rubber, ethylene-propylene rubber, ethylene-propylene-dimer rubber, chlorinated rubber, and thermoplastic rubber block copolymers. Preferably, mixtures of block copolymers and polymerized oils are employed as bleed inhibitors. The optional anti-oxidants may be present in an amount of 0.1–2% by weight. Preferably, the anti-oxidant includes a sterically hindered phenolic compound that includes a sulfur linkage.

The gelled oil compositions of the invention have improved protective properties and less abrasiveness than silica based competitive products. Moreover, these gelled oil compositions, useful as protective filling compositions in telecommunications and other electrical devices, can achieve the same viscosity as formulations based on silica but with surprisingly lower amounts of gelling agent.

Gel compositions that are particularly useful as filling compositions for protecting telecommunications articles from moisture and corrosion include 20–90% of an oil such as mineral oil and 5–50% of bleed inhibitor where the weight ratio of mineral oil to bleed inhibitor is 7:3–1:1, the mole ratio of fatty acid to aromatic acid in the aluminum soap complex is about 1:1, and the mole ratio aluminum-:(fatty acid+aromatic acid) in the aluminum soap complex is about 1:2.

Having briefly summarized the invention, the invention will now be described in detail by reference to the following specification and non-limiting examples. Unless otherwise specified, all percentages are by weight and all temperatures are in degrees Celsius.

BRIEF DESCRIPTION OF THE DRAWINGS

A better understanding of the preferred embodiment may be had by reviewing the attached drawings wherein.

DETAILED DESCRIPTION OF INVENTION

The gelled oil compositions of the invention normally include an oil component, an aluminum soap complex, a bleed inhibitor, and optional amounts of pour point depressant and antioxidant. In the preferred embodiment of the invention, the gelled oil compositions are packed in and around telecommunications articles to protect these articles from moisture and corrosion.

In a preferred embodiment, the metal shield in a telecommunications service cable, which covers the bundle of wires, typically copper, in the cable, is filled with a gelled oil composition of the invention to protect the wires and devices attached to the wires from moisture in the event the cable is cut.

Figure 1:
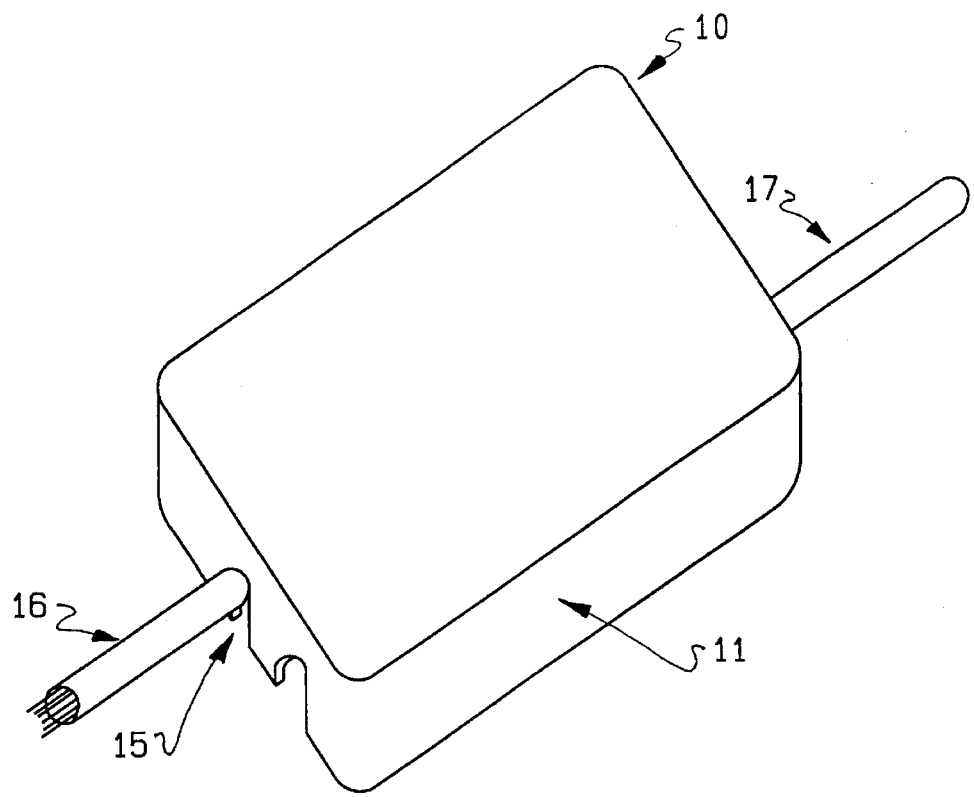
FIG. 1 is a perspective view of an inline splice connector.
Figure 2:
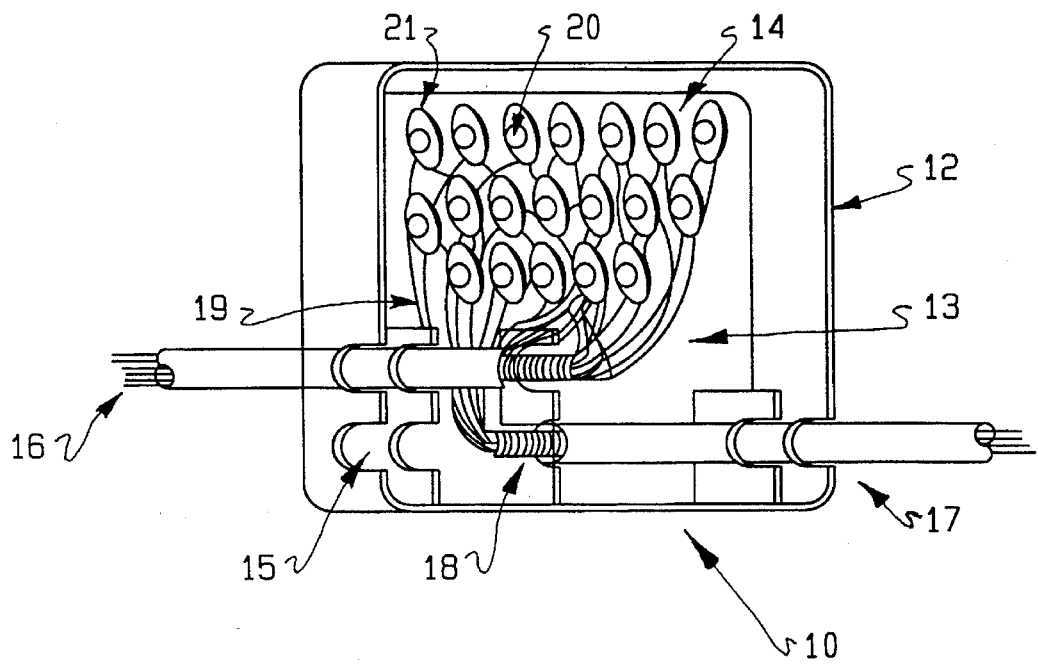
FIG. 2 is a view of the base of the connector of FIG. 1 to illustrate the wire connections therein.

Referring to FIGS. 1 and 2, there is illustrated a preferred embodiment of the present invention, wherein an inline splice connection is made within a two piece enclosure, 10, for protection against moisture and corrosion. The enclosure comprises a top, 11, and a base, 12, which are constructed with sides that overlap when the enclosure is assembled, leaving a bay, 13, in the interior for making connections. Typically, the enclosure is formed with a splicing tray, 14, in the base, 12, and with entry ports, 15, for the service cables, 16 and 17, in the top, base, or sides. Insulation is removed from the cores of the service wires, 18, and the individual service wires, 19, are connected to pins, 20, and held in place by a locking device, 21, such as a nut or clip, in the splicing tray 14, to connect the input cable, 16, to the output cable, 17. The top is filled with the gelled oil composition of the invention. To assemble the enclosure and protect the electrical connections within, the cover of the enclosure is first aligned over the splicing tray in the base. The enclosure is then squeezed shut using pressure applied by the user's hands until any gaps and the service wire ports in the enclosure are filled with the gelled oil filling composition. As a result, the gelled oil forms a moisture barrier that completely excludes water and protects the electrical connections from moisture and corrosion; the terminal block may be buried immediately after closure.

The enclosure may be made of any corrosion resistant material, known to those skilled in the art, that is capable of withstanding exposure to moisture and corrosive materials and the physical stresses and impacts that occur when the device is buried. Similarly, enclosures for above ground use must be constructed from a material able to withstand exposure to extremes of temperature, wind, rain, ice, snow, and direct sunlight that occur when telecommunications service wires are installed on poles.

The conductive metal wire of the electrical components is generally comprised of copper. One of ordinary skill in the art is well aware of the various grades and types of copper and copper alloys that are conventionally utilized in such applications.

The oil component of the gelled oil composition may be about 40–90%, preferably 50–75% by weight of the composition; the bleed inhibitor may be about 5–50%, preferably 25–45%; the aluminum soap complex may be about 4–15%, preferably 5–12%, most preferably 6–10% of the composition. The optional pour point depressant may be about 0.5–10%, preferably 1–3%, and the optional antioxidant may be about 0.1–2%, preferably 0.51–1.5% of the composition.

Generally, the gelled oils of the invention are produced by forming an aluminum soap complex in-situ in the presence of the oil component. The oil component includes one or more bleed inhibitors, as well as optional antioxidants and pour point depressants.

The oil component of the gelled oil compositions can be a hydrocarbon oil such as a mineral oil, an alpha olefin of ten carbon atoms or less which has been polymerized into an oil, a napthenic oil, or a paraffinic oil. Preferably, the oil component is a mineral oil, most preferably a food grade mineral oil. Particularly useful hydrocarbon oils have an aniline point above 220° F. a flash point of at least 350° F., preferably 500° F. a viscosity of 65–600 Sabolt Universal Seconds ("SUS") at 100° F., preferably 530 SUS, and an average number molecular weight of at least 300, preferably greater than 400.

For the purpose of this disclosure, the following terms have the following meanings:

(a) "Paraffinic mineral oil" means a mineral oil having a viscosity-gravity constant, as determined by the procedure specified in the American Society of Testing Materials (ASTM) D 2501-67 procedure, between 0.78 and 0.85 inclusive with a minimum of 65 percent paraffinic carbon atoms and a maximum of 5 weight percent aromatic carbon atoms.

(b) "Naphthenic mineral oil" means a mineral oil having a viscosity-gravity constant, as determined by the procedure specified in the American Society of Testing Materials D 2501-67 procedure, between 0.78 and 0.85 inclusive with a minimum of 35 percent naphthenic carbon atoms and a maximum of 5 percent aromatic carbon atoms.

Mineral oils useful in the gelled oils of the invention generally include but are not limited to transformer oil, spindle oil, cable insulating oil and machine oil. Useful napthenic oils include but are not limited to Drakeol 35, available from Pennreco Company, Telura oils such as Telura and Coastal Pale Oils from Exxon. Useful paraffinic oils include but are not limited to Pale 100, and Telura oils such as Telura 607, all of which are available from Exxon. In accordance with the invention, the aluminum soap complexes can be readily adjusted to serve as effective gelling agents for a wide variety of oils. Typically, the composition of the aluminum soap complex is varied by control of the fatty acid and aromatic acid components depending on the aniline point of the oil component. The formulation variables of the soap complex include the molar ratio of aromatic acid to fatty acid, the carbon chain length of the fatty acid, and the molar ratio of total acids (fatty and aromatic) to aluminum. The fatty acid:aromatic acid mole ratio generally is from about 1.4:0.6 to 0.6:1.4, and preferably 1:1. The total acids:aluminum ratio is about 1.8:1–2.2:1, preferably 1.9:1 to 2.1:1 and most preferably 2:1.

As is known in the art, aluminum soap complexes are formed by reacting an organo-aluminumoxy compound with a fatty acid and an aromatic acid. The soaps may be formed in-situ in the presence of the oil component, or may be preformed and added to the oil component. Preferably, the aluminum soap complexes are formed in-situ in the presence of the oil component by reacting one mole of stearic acid, one mole of benzoic acid, and a tri-aluminum tri-alkoxide in the presence of a high aniline point mineral oil, especially mineral oils such as Drakeol 500 available from Pennreco.

A variety of fatty acids may be employed to form the aluminum soap complexes employed in the invention. Generally, these acids are of animal origin, or from vegetable matter or marine life. Fatty acids which can be employed to provide useful aluminum soap complexes include but are not limited to fatty acids with chain lengths of $C_8$–$C_{22}$. Preferably, the fatty acid chain length is $C_{12}$ to $C_{12}$, most preferably $C_{14}$–$C_{18}$. Useful fatty acids are exemplified but are not limited to stearic acid, myristic acid, capric acid, oleic acid and palmitic acid as well as mixtures of these acids. Rubber grade stearic fatty acids and simple tallow fatty acids, unhydrogenated, also may be used.

The amount of unsaturation in the fatty acid employed to form the aluminum soap complexes also may vary. Typically, the degree of unsaturation, measured in terms of iodine value, is 0.5 but it can be as much as 10 to 12.

The aluminum component employed to produce the aluminum soap complexes typically is provided in the form of an alkoxide, preferably isopropoxide or trimers thereof. Other useful sources of the aluminum component may be provided as oxyaluminum acylates such as oxyaluminum octoate, and aluminum alkoxide chelates such as ketalin (available from Chattem Chemicals).

The aluminum soap complexes which are useful as gelling agents in the invention may be employed in admixture with metallic soaps of alkaline and alkaline earth metals such as Na, Ca, Li, Ba, Sr, Zn, Pb, Cd, K and like metals. Additional thickeners and gelling agents may be combined with the aluminum soap complexes. Useful additional thickeners and gelling agents include bentonite, silica and phthalocyanine; polyureas such as those having 2 to 20 urea bonds and a molecular weight of 100 to 5,000; amino acid-type oil gelling agents such as N-lauroyl-L-glutamic acid-α, β-di n-butyramide; cellulose derivatives such as quaternary ammonium salt of cellulose and fatty acid esters of dextrin and the like.

The amount of the aluminum soap complexes can be employed as gelling agents vary over a wide range of weight percents. However, if the amount of aluminum soap complex is excessive, the viscosity and yield point of the resulting gelled oil formulation may become excessive.

The bleed inhibitors employed in the gelled oils can be synthetic hydrocarbon oils or block copolymers, as well as mixtures thereof, preferably mixtures. Low molecular weight synthetic oils are particularly desirable as bleed inhibitors. Useful synthetic oils include but are not limited to e-olefin oligomers, polymerized $C_2$–$C_9$ alkenes such as polybutene, polyisoprene, polyhexene, polyheptene, polyoctene, polynonene and the like. The most preferred synthetic oil bleed inhibitor is polybutene.

Examples of polymers useful as bleed inhibitors include ethylene/propylene rubber, styrene-butadiene rubber copolymers, styrene-ethylene/propylene rubber copolymers, styrene-ethylene/butylene-styrene block copolymers, styrene-isoprene-styrene block copolymers and, preferably, styrene-ethylene/propylene block copolymers. Preferably, the block copolymer is present in an amount of 0.5–10% by weight of the composition.

Among the preferred block copolymers that can advantageously be used as bleed inhibitors in the invention are styrene-rubber block copolymers. Exemplary block copolymers are linear block copolymers such as those which have styrene-rubber and styrene-rubber-styrene, radial block polymers of the formula (styrene-rubber)$_n$ where n typically is 3–4. Useful rubbers in these copolymers include but are not limited to isoprene, butadiene, ethylene/propylene, and mixtures thereof. These copolymers typically have a styrene:rubber ratio between approximately 1:9–1:1. Especially preferred block copolymers are styreneethylene/propylene block copolymers having a styrene:rubber ratio of about 0.37:0.63, unplasticized, specific gravity about 0.93, break strength (ASTM D-412) 300 psi, available from Shell Chemical Co. under the trade designation Kraton G 1701.

Pour point depressants useful in the gelled oils of the invention include Hitek 672, available from Ethyl Corp. The pour point depressants may form about 0.1–2% by weight of the gelled oil. Antioxidants useful in the gelled oils include sterically hindered phenolic compounds which have sulfur linkages. The antioxidants can be employed in an amount of 0.1–2% by weight of the gelled oil. The specific percentages of these components may vary depending on the intended application of the gelled oil.

As mentioned, the compositions of the aluminum soap complex can be tailored over a wide range to provide gelling agents which can be used with a much greater variety of oil compositions than is possible with the prior art silica based gelling agents. For example, the aluminum soap complexes can be tailored to achieve specific viscosities within the gelled oil by varying the chain length of the fatty acid employed to produce the aluminum soap complex. By reducing the chain length of the fatty acid employed to produce the aluminum soap complex, the viscosity of the gelled oil substantially can be decreased.

In gelled oil formulations particularly useful as protective filling compositions, the aluminum soap complex is formed, preferably, in situ by reaction of one mole of aluminum from aluminum compounds such as oxyaluminum acylates, aluminum alkoxide chelates and aluminum alkoxides or trimers thereof, with 1 mole of stearic acid and 1 mole of benzoic acid in the presence of the oil component. A high aniline point oil, preferably a food grade mineral oil, is used to provide gelled oil filling compositions. Oils which have an aromatic content of 0–11%, a napthenic content of 31–46%, and a paraffinic content of 51–65% are employed in terminal block filling compositions. A bleed inhibitor, and optional amounts of pour point depressant and antioxidant may be included.

Examples of suitable oils useful in manufacture of terminal block filling compositions include but are not limited to Puremore # WOT 14, Poly-XH51, and Poly X-M51P, all of which are available from Burmah-Castrol PLc, and Edelex 27 available from Shell U.K. Ltd. The aluminum soap complexes employed to provide terminal block filling compounds can be 4–30% of the gelled oil composition. The aluminum soap complexes have an aluminum to total acids mole ratio of 1:2.1–1:1.9, and a fatty acid:aromatic acid ratio of 1.3:0.7–0.7:1.3, preferably 0.9:1.1–1.1:0.9. The bleed inhibitor may be one or more of synthetic elastomers such as a styrene-butadiene block copolymer and a synthetic oil such as polybutene. Preferably, oil components useful as gelled oil filling compounds have viscosities of at least 150 cps at 25° C. Preferably the mineral oil and polybutene are employed in a weight ratio of 6:4.

Gelled oil compositions particularly useful in telecommunications applications are formulated with 54 to 56% of oil component of mineral oil (food grade), such as Drakeol 500 available from Pennreco, 6–7% of the aluminum soap complex, 34 to 36% of a bleed inhibitor of a polybutene such as Soltex PB32 available from Soltex Co., or Amoco H-300 available from Amoco Co. as well 1% of an antioxidant such as Irganox 1035 available from Ciba Geigy, and 1 to 2% of a bleed inhibitor such as Kraton G-1701 available from Shell Oil Co., and 0.2% of a pour point depressant. The aluminum soap complexes employed in the terminal block filling gelled oil formulations preferably have a fatty acid to aromatic acid ratio of 1:1 and a ratio of total acids (fatty+ aromatic) to aluminum of 2.1. Useful aromatic acids include benzoic acid, p-toluic acid, o-toluic acid, 2-chlorobenzoic acid, α-naphthoic acid, β-naphthoic acid, 9-phenanthroic acid, 3-phenanthroic acid, anthraquinone-α-carboxylic acid, anthraquinone-β-carboxylic acid and dehydroabietic acid.

EXAMPLE 1

259.95 grams of Drakeol 500, 173.3 grams of polybutene 32 and 10 grams Kraton G 1701 are charged to a resin flask equipped with a heating mantle, a stirrer, a dropping funnel, a nitrogen inlet and a gas outlet tube. Nitrogen gas is admitted to the flask and 22.74 grams of stearic acid (acid number 205.60) is added. The resulting mixture is stirred while heating to a temperature of 100° C. 9 grams of tri-aluminum-tri-isopropoxide (12.5% Al) is added drop-wise. 10 grams of benzoic acid is added, the temperature increased to 124° C., and an additional 9 grams of tri-aluminum-tri-isopropoxide is added drop-wise. The temperature is further increased to 190° C. over 49 minutes. The temperature is maintained for eight minutes while stirring under nitrogen. The mixture is cooled to 130° C. over a 17 minute period. Five grams of Irganox 1035 (available from Ciba-Geigy) anti-oxidant and 1 gram of Hitek 672 pour point depressant is added. The resulting mixture is cooled to room temperature over night to yield a gelled product.

EXAMPLE 2

The procedure of example 1 is followed except that Kraton G1701 is not employed.

EXAMPLE 3 (COMPARATIVE)

The procedure of example 1 is followed except that polybutene 32 is not employed.

EXAMPLE 4 (COMPARATIVE)

The procedure of example 1 is followed except that both polybutene 32 and Kraton G1701 are not employed.

EXAMPLE 5

254.43 grams of Drakeol 500 oil, 169.62 grams of polybutene 32, 10 grams of Kraton G1701, 7.59 grams of stearic acid of acid number 205.60, and 42.38 grams of Kolate 6054 (5.3% aluminum), available from Rhone-Poulenc, are charged to a resin flask equipped as in example 1. Nitrogen gas is admitted and the temperature is raised to 100° C. Benzoic acid (9.99) grams is added and the temperature is raised to 125° C. and maintained for 20 minutes. Thereafter, the temperature is raised to 190° C. over a period of 49 minutes. The temperature is maintained for eight minutes while stirring under nitrogen. The mixture then is cooled to 130° C. over a 17 minute period. 5 grams of Irganox 1035, 1 gram of Hitek 672 pour point depressant than is added. The resulting mixture is cooled to room temperature over night to yield a gelled product.

EXAMPLE 6

258.81 grams of Drakeol 500, 172.54 grams polybutene 32, and 10 grams of Kraton G1701 are charged to a resin flash equipped as in Example 1. Nitrogen gas is admitted to the flask and 21.26 grams myristic acid (acid number= 246.50) is added. The resulting mixture is stirred while heating to a temperature of 100° C. 10.09 grams of tri-aluminum, tri-isoproxide (12.5% Al) is added drop-wise. 11.22 grams of benzoic acid is added, temperature increased to 124° C., and an additional 10.09 grams of the tri-aluminum-tri-isoproxide is added drop-wise. The temperature further is increased to 190° C. over 49 minutes. The temperature is maintained for 8 minutes while stirring under nitrogen. The mixture is cooled to 130° C. over 17 minutes. Five grams of Irganox 1035 and 1 gram Hitek 672 is added. The resulting mixture is cooled over night to yield a gelled product.

EXAMPLE 7

267.30 grams of Drakeol 500, 178.20 grams of polybutene-32, and 5 grams of Kraton G1701 are charged to a resin flask equipped as in Example 1. Nitrogen is admitted to the flask and 19.49 grams of stearic acid (acid number= 205.60) is added. The resulting mixture is stirred while heating to a temperature of 100° C. 7.72 grams of tri-aluminum-tri-isoproproxide (12.5% AL) is added drop-wise. 8.58 grams of benzoic acid is added, temperature increased to 124° C., and an additional 7.72 grams of the aluminum-tri-isoproproxide is added drop-wise. The temperature further is increased to 190° C. over 49 minutes. The temperatures is maintained for 8 minutes while stirring under nitrogen. The mixture is cooled to 130° C. over 17 minutes. Five grams of Irganox 1035 and 1 gram Hitek 672 is added. The resulting mixture is cooled over night to yield a gelled product.

The properties of the gel formulations formed by these examples are summarized below in Table I.

Each of the gel formulations of Examples 1, 3, 5, 6, and 7 would be useful as protective filling compositions in one or more of the telecommunications articles or devices disclosed herein. In comparison to silicone based greases, the present formulations provide equivalent performance in these applications, but at a significant cost advantage.

For example, those having a low yield point, i.e., 5 or less, would be more suitable for use in devices that generate a lower stress on the composition, such as a terminal block or telephone jack. For devices that generate a higher degree of stress on the composition, the higher yield point formulations are preferred. One of ordinary skill in the art can select the appropriate formulation for the intended use.

The effect of varying the fatty acid component of the aluminum soap complex on the viscosity of the gelled oil is shown in Table I. In Table I, the fatty acid:benzoic acid mole ratio is 1 and the total acids to aluminum mole ratio is 2. The ratio of the oil component to the polybutene bleed inhibitor is 6:4.

As shown in Table I, it was surprising that, in Example 6 as compared to Examples 1 and 5, a reduction in chain length of a fatty acid dominates the tendency toward higher viscosities that occur due to increased soap content and/or increased amounts of bleed inhibitors. Example 6 also illustrates the unexpected finding that a small reduction in chain length dramatically reduces yield point and relation time of the gelled oil.

In the above examples, viscosity is determined on a Brookfield Cone and Plate Viscometer Model DV-II, in accordance with the operating instructions for that viscometer at a shear rate of 20 reciprocal seconds. The yield point is estimated by measuring the storage modulus (G'), at a frequency of 1 Hertz, as a function of strain on a Bohlin VOR rheometer. From the values of G' versus strain, the critical strain (the strain, which if exceeded, yields a decrease in G') is calculated by methods known in the art. The yield point is estimated by multiplying the critical strain by the average value of G' for strain values less than the critical strain.

Relaxation time is determined by measuring the stress relaxation of the gel on the Bohlin VOR rheometer at a strain less than the critical strain as defined above. In these tests, the frequency is 1 Hertz. During the test, the storage modulus $G^1$ is monitored as a function of time. The relaxation time is the time at which $G^1$ reaches the value:

$$\left( \frac{G^1_{initial}}{e} \right)$$

The paper bleeding test is described as follows:

MATERIALS 1. 5 ml syringe
2. 11 cm diameter, type 1 filter paper
3. Pyrex watchglass (12 cm diameter)
4. 600 ml Pyrex beaker
5. Lab spatula
6. Analytical balance
7. Tweezers
8. Scissors
9. Forced draft oven set to 65° C.

TABLE I

| EXAMPLE | TOTAL ACID: AL MOLE RATIO | ALUMINUM SOURCE | % SOAP | OIL/ PB[1] | % RUBBER BLEED INHIBITOR | (%) BLEED 65 C | VISC. (CPS)[3] | FA/ BA[4] | RELAXATION TIME SEC. | YIELD POINT (Pa) |
|---|---|---|---|---|---|---|---|---|---|---|
| 1 | 2 | Tri-aluminum-tri-isopropoxide | 7 | 60/40 | 2 | 0.4 | 39,100 | 1/1 | 105 | 8 |
| 2 Control | 2 | Tri-aluminum-tri-isopropoxide | 7 | 60/40 | 0 | 12.0 | 24,700 | 1/1 | 501 | 5 |
| 3 | 2 | Tri-aluminum-tri-isopropoxide | 7 | 100/0 | 2 | 3.2 | 28,200 | 1/1 | 618 | 11 |
| 4 Control | 2 | Tri-aluminum-tri-isopropoxide | 7 | 100/0 | 0 | 17.7 | 23,600 | 1/1 | 501 | 38 |
| 5 | 2 | Kolate 6054 | 7 | 60/40 | 2 | 0.8 | 40,200 | 1/1 | 474 | 9 |
| 6 | 2 | Tri-aluminum-tri-isopropoxide | 7 | 60/40 | 2 | 2 | 22,350 | 1/1 | 2 | 1 |
| 7 | 2 | Tri-aluminum-tri-isopropoxide | 6 | 60/40 | 1 | 4.8 | 22,366 | 1/1 | 294 | 5 |

[1]PB = polybutene 32
[2]Kraton G 1701
[3]Shear rate = 20/sec.$^{-1}$
[4]FA = Fatty Acid, BA = Benzoic Acid

PROCEDURE

1. Load the grease compound into the syringe with a spatula. Slowly press the plunger to eliminate air bubbles.

2. Cut a 1 in. by 1 in. filter paper square; weight (WT and record (to 0.0001 grams).
3. Slowly apply 1 ml of the compound from the syringe onto the filter paper square in a circular dab. (Leave some room around the edges to allow the dab to spread.) Weigh this "sample square" and record this value as WT 2.
4. Weigh an 11 cm diameter filter paper circle (WT 3), and place it on the watchglass. Put the "sample square" on the center of the filter paper, and cover with a 600 ml beaker.
5. Let the sample lie undisturbed at room temperature for 16 hours.
6. Weigh the sample square (WT 2A) and the large filter paper circle (WT 3A).
7. Replace the sample square under the beaker, and place the entire assembly in the oven. Do not disturb for 24 hours.
8. Remove from the oven and allow to cool for 5 minutes on a marble surface. Weigh the sample square (WT 2B) and the filter paper circle (WT 3B). Note any color changes.
9. Discard sample square and filter paper.
10. When handling the sample square and the filter paper circle, use only tweezers. Take care to keep moisture and all foreign particles away from the sample square.

CALCULATIONS

1. Initial Weight=(WT 2)–(WT 1)
2. Weight Loss=(WT 2)–(WT 2A or WT 2B)
3. % Weight Loss=Weight Loss×100/Initial Weight
4. Filter Paper Weight Gain=(WT 3A or WT 3B)–(WT 3)
5. Volatile Weight
   a. (Weight Loss)–(Filter Paper Weight Gain) if>0 or
   b. 0, if (Weight Loss)–(Filter Paper Weight Gain)≦0
6. % Volatile Weight=Volatile Weight×100/Initial Weight
7. % Nonvolatile Separation=% Weight Loss–% Volatile Weight "A" values are used to calculate weight change after 16 hours at room temperature. "B" values are used to determine weight change after the additional 24 hours at 65° C.

MEASUREMENT ERROR

Due to repeated handling of the sample, some error in measurement should be expected, especially in calculating volatile weight loss at room temperature. All weights should be recorded to the nearest 0.0001 gram. All calculated results should be reported to the nearest whole number. At least three samples should be tested simultaneously per compound to be evaluated. The resulting percentage values can then be averaged to determine the % Weight Loss and % Nonvolatile Separation. The following examples demonstrate the moisture and corrosion resistance of enclosures and devices using the gelled oil filling compositions of the invention.

EXAMPLE 8

Three splices were prepared in an enclosure according to the present invention using the gelled oil formulation of Example 5, but with 10% soap and no bleed inhibitor. These splices included a ring conductor and a tip conductor, and were immersed in tap water at a depth of 24 to 30 inches and a temperature of between 65° F. (18.5° C.) and 80° F. (26.5° C.). A potential of 48 volts dc was maintained between the ring conductor and the tip conductor for 14 days. The installation resistance was measured after one hour, and then remeasured daily. At the end of the test, the resistance between wires exceeded $10^8$ ohms when measured at 100 volts dc. No water penetrated the ⅞ inch gelled oil in the enclosure.

EXAMPLE 9

Splices made using the gelled oil of Example 8 were subject to the conditions detailed in Example 8 for a period of 42 days. Again, the resistance between wires exceeded $10^8$ ohms when measured at 100 volts dc.

EXAMPLE 10

Splices made using the gelled oil of Example 8 were subjected to the conditions detailed in Example 8. The resistance between wires exceeded 108 ohms when measured at 50 volts dc, 100 volts dc, and 500 volts dc.

EXAMPLE 11

One inch sections of 0.25 inch diameter copper tubing were immersed in a five percent NaCL solution for 30 days. One sample was coated with the gelled oil of Example 8, while two were each coated with one of two different commercial silica mineral oil greases with yield, strength, and viscosity similar to the gelled oil. The control sample was left uncoated. The results show that the gelled oil sample of the invention performed the best in that the copper material appeared essentially unaffected. In comparison, both of the samples coated with the commercial greases, as well as the uncoated control, exhibited the formation of black oxide deposits on most of the outer surfaces of the copper tubing. This indicates that the gelled oil of the present invention is more effective than the others.

EXAMPLE 12

Six enclosures were prepared according to Examples 8–10 of the present invention with a one foot long service wire exiting through a port in each enclosure. The service wires were not constructed in accordance with the present invention. The end of each wire was cut, and a two foot head of water was applied to the end of the service wire. The insulation resistance between service wires was then monitored for 14 days. Although two of the six samples failed, the failure was not due to the gelled oil. Instead, water was able to penetrate through approximately one foot of the length of the service wire. Thus, the 12 inches of service wire provided less protection than the ⅞ of an inch of gelled oil composition used to seal the enclosures.

In addition to protecting telecommunications devices, the gelled oil filling compositions of the invention can be used as encapsulants or potting compounds to seal electrical or other water sensitive components from the introduction of moisture or water thereon. These compositions can be used in place of the soft polyurethane elastomers of the prior art for these applications. For example, the compositions of the invention can be introduced into the test ports of a terminal block for electrical connectors so as to form a moisture proof seal over the port. Moreover, electrical access to the test port can be achieved by piercing the gel with a probe. Other related uses for these compositions in protecting electrical devices would be understandable to one skilled in the art.

What is claimed is:

1. An article for transmitting telecommunications signals comprising at least one conductive metal wire for carrying an electrical signal; a conductive metal element in electrical communication with the wire to receive the electrical signal; an external sheath and a gelled oil composition for protecting the metal wire and element from moisture, the gelled oil composition comprising about 40 to 90% of an oil component, about 5 to 50% of a bleed inhibitor comprising a rubber block copolymer or a synthetic oil which is different from the oil component, and about 4 to 15% of an aluminum soap complex and placed between the external sheath and the wire and element.

2. An article of manufacture comprising a telecommunication cable having an external sheath surrounding a core, with a plurality of information carrying elements comprising conductive metal wire located in the core, and a gelled oil composition which is disposed in said core between the elements and the sheath; said gelled oil composition comprising about 40 to 90% of an oil component, about 5 to 50% of a bleed inhibitor comprising a rubber block copolymer or a synthetic oil which is different from the oil component, and about 4 to 15% of an aluminum soap complex and placed between the sheath and the elements.

3. An article of manufacture for the protection of telecommunications devices, comprising an enclosure formed of at least two components, wherein a first component contains a telecommunications device, and a second component includes a gelled oil composition, such that, when the enclosure is formed from the assembly of the components, the gelled oil composition contacts and protects the telecommunications device from moisture and corrosion; said gelled oil composition comprising about 40 to 90% of an oil component, about 5–50% of a bleed inhibitor comprising a rubber block copolymer or a synthetic oil which is different from the oil component, and about 4 to 15% of an aluminum soap complex.

4. The article of claim 1, 2 or 3 wherein said gelled oil includes said oil component in an amount of about 50–75%, said bleed inhibitor in an amount of about 25–45%, and said aluminum soap complex in an amount of about 6–12%.

5. The article of claim 4 wherein the oil component is at least one of a mineral oil, naphthenic oil, a paraffinic oil, or a polyalphaolefin oil.

6. The article of claim 4 wherein the aluminum soap complex comprises an aluminum salt of a fatty acid and an aromatic acid.

7. The article of claim 6 wherein said fatty acid is at least one of stearic acid, capric acid, oleic acid, myristic acid or palmitic acid, and said aromatic acid is at least one of benzoic acid, p-toluic acid, o-toluic acid, 2-chlorobenzoic acid, β-naphthoic acid, β-naphthoic acid, 9-phenanthroic acid, 3-phenanthroic acid, anthraquinone-β-carboxylic acid, anthraquinone-β-carboxylic acid, or dehydroabietic acid.

8. The article of claim 4 wherein the synthetic oil is α-olefin oligomers having up to 10 carbon atoms or a polymerized $C_2$–$C_9$ alkene.

9. The article of claim 4 wherein the rubber block copolymer comprises butyl rubber, ethylene-propylene rubber, ethylene-propylene dimer rubber, chlorinated rubber, or a thermoplastic rubber block copolymer and is present in an amount of 0.5 to 10% by weight of the composition.

10. The article of claim 4 wherein the oil component is a mineral oil, and the bleed inhibitor is polybutene, a rubber block copolymer, or a mixture thereof.

11. The article of claim 1, 2, or 3 further comprising at least one of a pour point depressant in an amount of between about 0.1 to 10% and an antioxidant in an amount of between about 0.1 to 2% by weight.

12. The article of claim 11 wherein the antioxidant comprises a sterically hindered phenolic compound that includes a sulfur linkage.

13. The article of claim 1 wherein the conductive metal of the wire and the element comprises copper.

14. The article of claim 1 wherein the element includes a terminal block.

15. The article of claim 1 wherein said article is a terminal block.

16. The article of claim 2 wherein the conductive metal of the transmission elements comprises copper.

17. The article of claim 3 wherein the conductive metal of the telecommunications device comprises copper.

18. The article of claim 3 wherein the one component includes a splicing tray and the other component is a cover.

19. The article of claim 18 wherein a plurality of service cables are connected in said splicing tray.

20. The article of claim 18 wherein said splicing tray comprises a plurality of pins, wherein a plurality of service cable wires are connected on each pin and held in place with a locking device.

21. The article of claim 3 wherein said article is a telephone jack, an insulation displacement connector, an inline splice kit, or a shrink termination kit.

* * * * *